United States Patent
Kakura

(10) Patent No.: US 8,477,754 B2
(45) Date of Patent: Jul. 2, 2013

(54) WIRELESS COMMUNICATION APPARATUS AND ANTENNA DIRECTIVITY/RADIO RESOURCE ASSIGNING METHOD

(75) Inventor: Yoshikazu Kakura, Minato-ku (JP)

(73) Assignee: NEC Corporation, Tokyo (JP)

( * ) Notice: Subject to any disclaimer, the term of this patent is extended or adjusted under 35 U.S.C. 154(b) by 872 days.

(21) Appl. No.: 11/814,131

(22) PCT Filed: Jan. 18, 2006

(86) PCT No.: PCT/JP2006/300575
§ 371 (c)(1),
(2), (4) Date: Jul. 17, 2007

(87) PCT Pub. No.: WO2006/077842
PCT Pub. Date: Jul. 27, 2006

(65) Prior Publication Data
US 2008/0171516 A1    Jul. 17, 2008

(30) Foreign Application Priority Data
Jan. 19, 2005  (JP) ................................. 2005-011025

(51) Int. Cl.
*H04B 7/216* (2006.01)
(52) U.S. Cl.
USPC ........... 370/342; 370/328; 370/329; 370/332; 455/423; 455/452.1; 455/446; 455/63.4
(58) Field of Classification Search
USPC ................. 370/330, 332, 339, 328, 342, 329; 455/422.1, 423, 429, 25, 63.4, 562.1, 452.1, 455/446
See application file for complete search history.

(56) References Cited

U.S. PATENT DOCUMENTS

| | | | |
|---|---|---|---|
| 7,200,127 B1* | 4/2007 | Lee et al. | 370/335 |
| 2002/0039912 A1* | 4/2002 | Yamaguchi et al. | 455/561 |
| 2003/0021245 A1* | 1/2003 | Haumonte et al. | 370/330 |
| 2004/0235472 A1* | 11/2004 | Fujishima et al. | 455/434 |
| 2005/0272472 A1* | 12/2005 | Goldberg et al. | 455/562.1 |

FOREIGN PATENT DOCUMENTS

| | | |
|---|---|---|
| JP | 5-259969 A | 10/1993 |
| JP | 09-284200 A | 10/1997 |
| JP | 2000-232671 A | 8/2000 |
| JP | 2002-111556 A | 4/2002 |

(Continued)

Primary Examiner — Marcos Torres
(74) Attorney, Agent, or Firm — Sughrue Mion, PLLC

(57) ABSTRACT

A wireless communication apparatus is provided that is capable of achieving both the suppression of interference between base stations and the capability to track mobile stations that are moving at a high speed. A moving speed estimating unit estimates the moving speed of each mobile station based on reception signals. A directivity determining unit determines reception antenna directivity for each mobile station based on the reception signals and the estimated moving speeds. A signal separating unit separates the reception signals into signal components that have been transmitted from respective mobile stations, based on the directivities. A signal recovering unit recovers transmission signals from respective mobile stations based on the respective signal components. A resource assigning unit determines radio resource assignments of transmission signals to the respective mobile stations based on a service quality signal and the estimated moving speed. A transmission signal generating unit generates transmission signals based on transmission information, the directivities, and the resource assignments. A transmission signal multiplexes the transmission signals, using the resource assignment signals, and outputs the multiplexed transmission signal.

17 Claims, 9 Drawing Sheets

FOREIGN PATENT DOCUMENTS

| | | |
|---|---|---|
| JP | 2003-32167 A | 1/2003 |
| JP | 2003-70055 A | 3/2003 |
| JP | 2003-179981 A | 6/2003 |
| JP | 2003-198508 A | 7/2003 |
| JP | 2003-235072 A | 8/2003 |
| WO | WO 01/91332 A1 | 11/2001 |

* cited by examiner

US 8,477,754 B2

WIRELESS COMMUNICATION APPARATUS AND ANTENNA DIRECTIVITY/RADIO RESOURCE ASSIGNING METHOD

TECHNICAL FIELD

The present invention relates to a wireless communication apparatus, and more particularly to an antenna directivity control and radio resource assigning method for suppressing interference between base stations using antenna directivities.

BACKGROUND ART

In a cellular mobile communication system, suppression of interference between base stations is required for the achievement of higher transmission capacity. As a conventional technique to reduce interference between base stations, there is known a method for suppressing transmission of radio waves in an unwanted direction using antenna directivities (see, for example, Patent literature 1).

FIG. 1 illustrates the configuration of a wireless communication apparatus that is intended to suppress interference between base stations using antenna directivities. The number of mobile stations is herein assumed to be two.

As shown in FIG. 1, wireless communication apparatus 3 comprises antennas 11, 12, switches 13,14, signal separating unit 15, signal recovering units 16,17, transmission signal generating units 21, 22, directivity determining unit 31, resource assigning unit 32, and signal multiplexing unit 33.

At the signal reception, switches 13 and 14 capture within wireless communication apparatus 3 respective reception signals $S_{RX1}$, $S_{RX2}$ that were received by antennas 11, 12, respectively. Directivity determining unit 31 receives as input reception signals $S_{RX1}$, $S_{RX2}$, determines reception antenna directivity for each mobile station (not shown), and outputs antenna directivity signals $S_{DC1}$ and $S_{DC2}$. Using antenna directivity signals $S_{DC1}$ and $S_{DC2}$ indicative of the antenna directivity for each mobile station, signal separating unit 15 separates reception signals $S_{RX1}$, $S_{RX2}$ into signal components that were transmitted from respective mobile stations, and outputs reception mobile station signals $S_{RXMS1}$, $S_{RXMS2}$. Signal recovering units 16, 17 receive as input respective reception mobile station signals $S_{RXMS1}$, $S_{RXMS2}$, recover transmission information from each mobile station, and output respective recovered mobile station signals $S_{RSMS1}$, $S_{RSMS2}$. Resource assigning unit 32 receives as input service quality signal $S_{QOS}$, assigns resources of transmission signals to each mobile station, and outputs resource assignment signal $S_{RA1}$, $S_{RA2}$. Transmission signal generating units 21, 22 receive as input respective transmission information $S_{TX1}$, $S_{TX2}$, respective antenna directivity signals $S_{DC1}$ and $S_{DC2}$ and respective resource assignment signals $S_{RA1}$, $S_{RA2}$, and output transmission signals $S_{TXS1-1}$ and $S_{TXS1-2}$, $S_{TXS2-1}$ and $S_{TXS2-2}$, respectively. Signal multiplexing unit 33 receives as input transmission signals $S_{TXS1-1}$, $S_{TXS1-2}$, $S_{TXS2-1}$, $S_{TXS2-2}$, multiples the transmission signals, and outputs multiplexed transmission signals $S_{DTXS1}$, $S_{DTXS2}$.

By thus using antenna directivity control in the transmission of signals to each mobile station for each base station (wireless communication apparatus 3), it is possible to reduce interference between base stations A1 and A2, as illustrated in FIG. 2. In FIG. 2, there exist high-speed mobile station M1-1 and low-speed mobile station M2-1 within the cell of base station A1, and there exist high-speed mobile station M1-2 and low-speed mobile station M2-2 within the cell of base station A2.

Patent literature 1: JP2003-198508A

DISCLOSURE OF THE INVENTION

Problems to be Solved by the Invention

However, the aforementioned conventional antenna directivity control method suffers from the problems: if antennas having a high directivity are used, then it is difficult to maintain the directivity toward a user who is moving at a high speed, whereas, if antennas having a low directivity are used and if great importance is attached to the capability to track a user who is moving at a high speed, then the effect of suppressing interference between base stations is reduced.

It is therefore an object of the present invention to remedy the aforementioned problems and to provide a wireless communication apparatus and antenna directivity/radio resource assigning method, which apparatus and method are capable of achieving both the effect of suppressing interference between base stations and the capability to track a user who is moving at a high speed.

Means to Solve the Problems

According to the present invention, there is provided a wireless communication apparatus for transmitting signals to and receiving signals from N mobile stations, N being a natural number greater than 2 or equal to 2, the apparatus comprising:

at the reception side, moving speed estimating means for estimating a moving speed of each mobile station based on M reception signals each received by the corresponding antennas, M being a natural number greater than 2 or equal to 2;

directivity determining means for determining an antenna directivity for each mobile station based on M reception signals and the moving speed estimated by said moving speed estimating means;

signal separating means for separating said M reception signals into signal components that have been transmitted from respective mobile stations, based on the directivities that have been determined by said directivity deciding means; and signal recovering means for recovering transmission signals from respective mobile stations based on the respective signal components that have been separated by said signal separation means;

at the transmission side, resource assigning means for determining radio resource assignments to said respective mobile stations based on a service quality signal indicative of the service quality of the mobile stations and the moving speeds estimated by said moving speed estimating means;

transmission signal generating means for generating N transmission signals based on N transmission information, the directivities that have been determined by said directivity determining means, and the resource assignments that have been determined by said resource assigning means; and transmission signal multiplexing means for multiplexing said N transmission signals that have been generated by said transmission signal generating means, using resource assignments that have been determined by said resource assigning means, and outputting the multiplexed transmission signal.

Further, according to the present invention, there is provided, in a wireless communication apparatus for transmitting signals to and receiving signals from N mobile stations, N being a natural number greater than 2 or equal to 2, a method of assigning different antenna directivities and different radio resources to the mobile stations based on the moving speed of the mobile stations, the method comprising the steps of:

estimating a moving speed of each mobile station based on M reception signals each received by the corresponding antennas, M being a natural number greater than 2 or equal to 2;

determining an antenna directivity for each mobile station based on M reception signals and the estimated moving speeds;

separating said M reception signals into signal components that have been transmitted from respective mobile stations, based on the determined directivities; and recovering transmission signals to respective mobile stations based on the separated respective signal components;

determining radio resource assignments to said respective mobile stations based on a service quality signal indicative of the service quality of the mobile stations and the estimated moving speed;

generating N transmission signals based on N transmission information, the determined directivities, and the determined resource assignments; and g) multiplexing said N transmission signals generated, using the determined resource assignments, and outputting the multiplexed transmission signal.

Each wireless communication apparatus, which is a base station, detects the moving speed of each mobile station within the coverage of the wireless communication apparatus and performs a control such that antenna directivity with a wide beam is used for a mobile station that is moving at a high speed, antenna directivity with a narrow beam is used for a mobile station that is moving at a low speed, and radio resources that are different according to a moving speed class are assigned to the mobile stations. Therefore, the present invention can simultaneously achieve both the suppression of interference between base stations and the capability to track a mobile station having a high moving speed.

Figure 1:
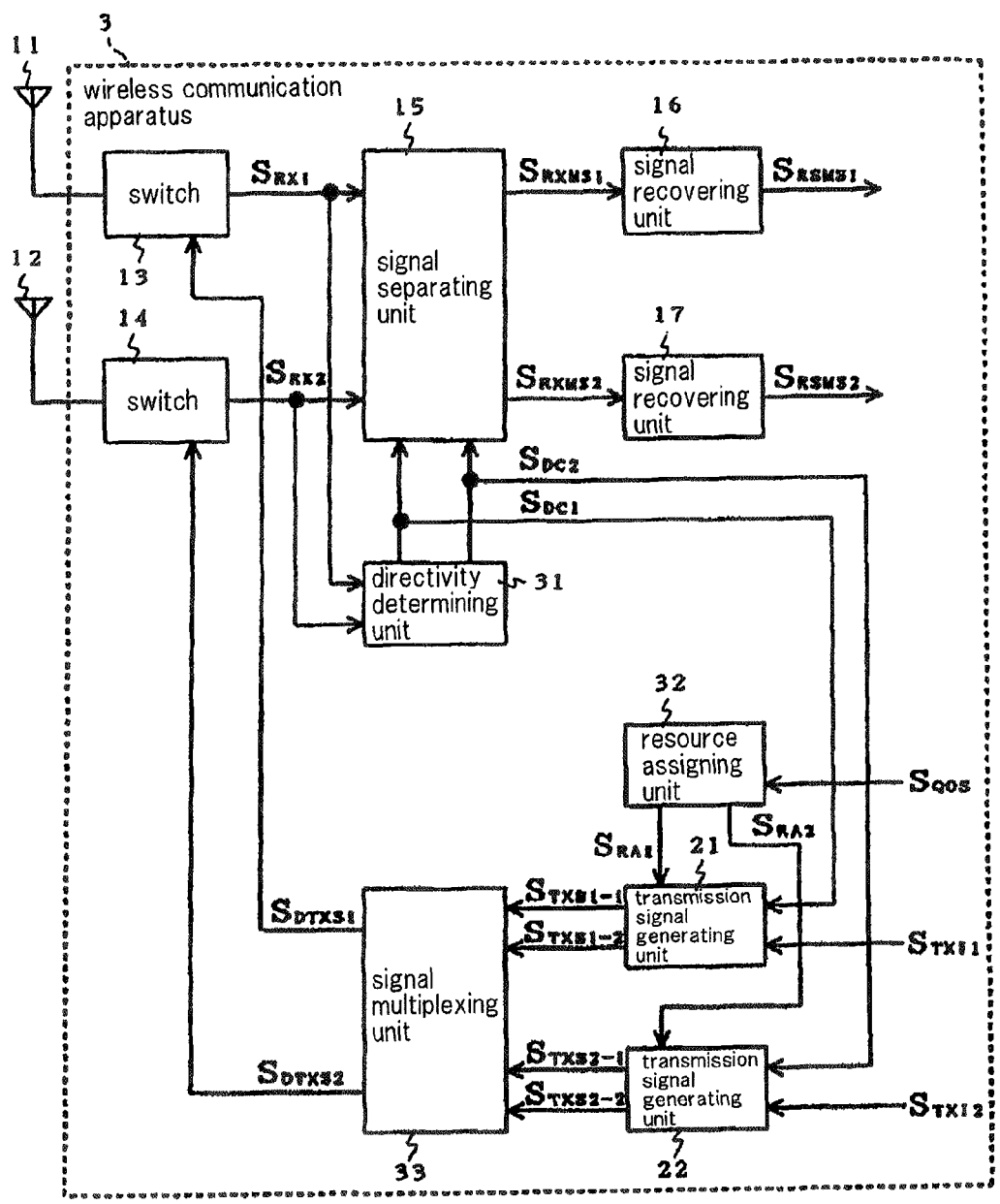
FIG. 1 is a block diagram illustrating the configuration of a conventional wireless communication apparatus.
Figure 2:
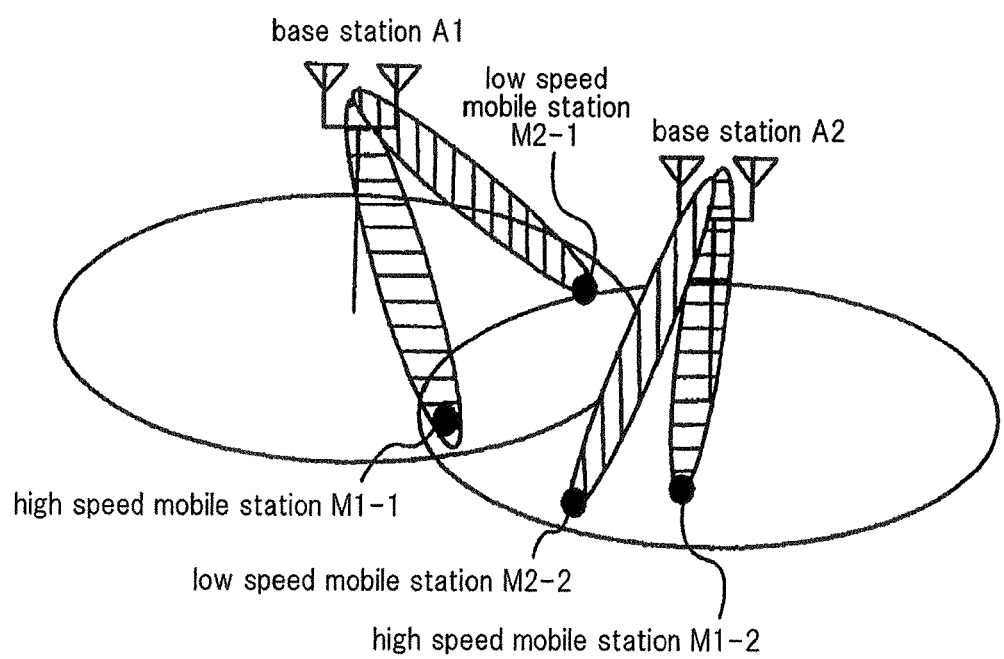
FIG. 2 is a diagram illustrating interference between base stations in the prior art shown in FIG. 1.

EXPLANATION OF REFERENCE SYMBOLS 1 wireless communication apparatus
11, 12 antenna
13, 14 switch
15 signal separating unit
16, 17 signal recovering unit
18 moving speed estimating unit
19 directivity determining unit
20 resource assigning unit
21, 21a, 22 transmission signal generating unit
23 signal multiplexing unit
101~109 step
211 encoder
212 modulator
213 weighting factor generator
214, 215 multiplier
216 serial/parallel conversion and copy selector

BEST MODE FOR CARRYING OUT THE INVENTION

Figure 3:
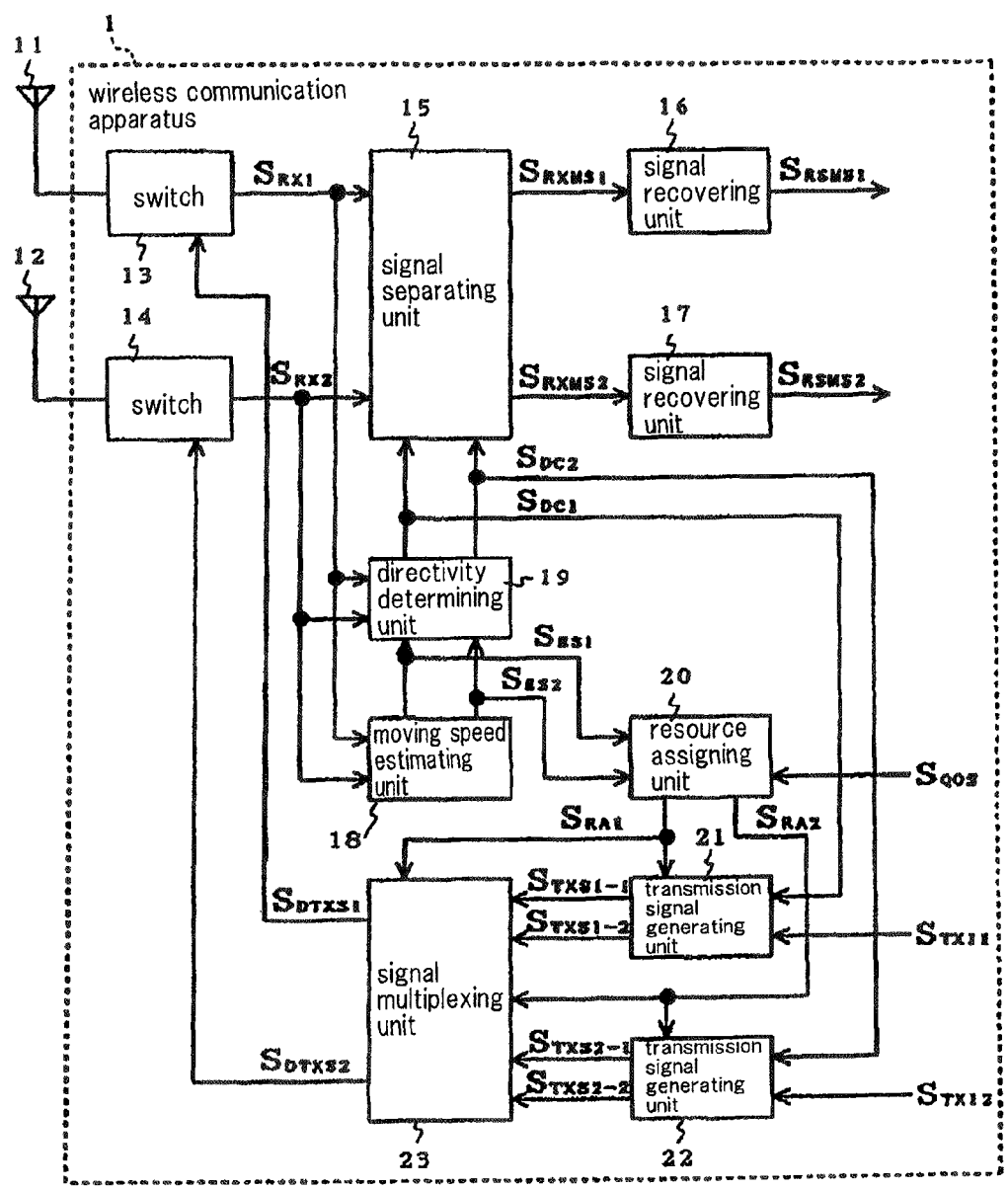
FIG. 3 is a block diagram of a wireless communication apparatus according to an embodiment of the present invention.

Referring to FIG. 3, wireless communication apparatus 1 according to an embodiment of the present invention comprises antennas 11, 12, switches 13,14, signal separating init 15, signal recovering units 16,17, moving speed estimating unit 18, directivity determining unit 19, resource assigning unit 20, transmission signal generating units 21, 22 and signal multiplexing unit 23. The number of mobile stations is herein assumed to be two.

Figure 4:
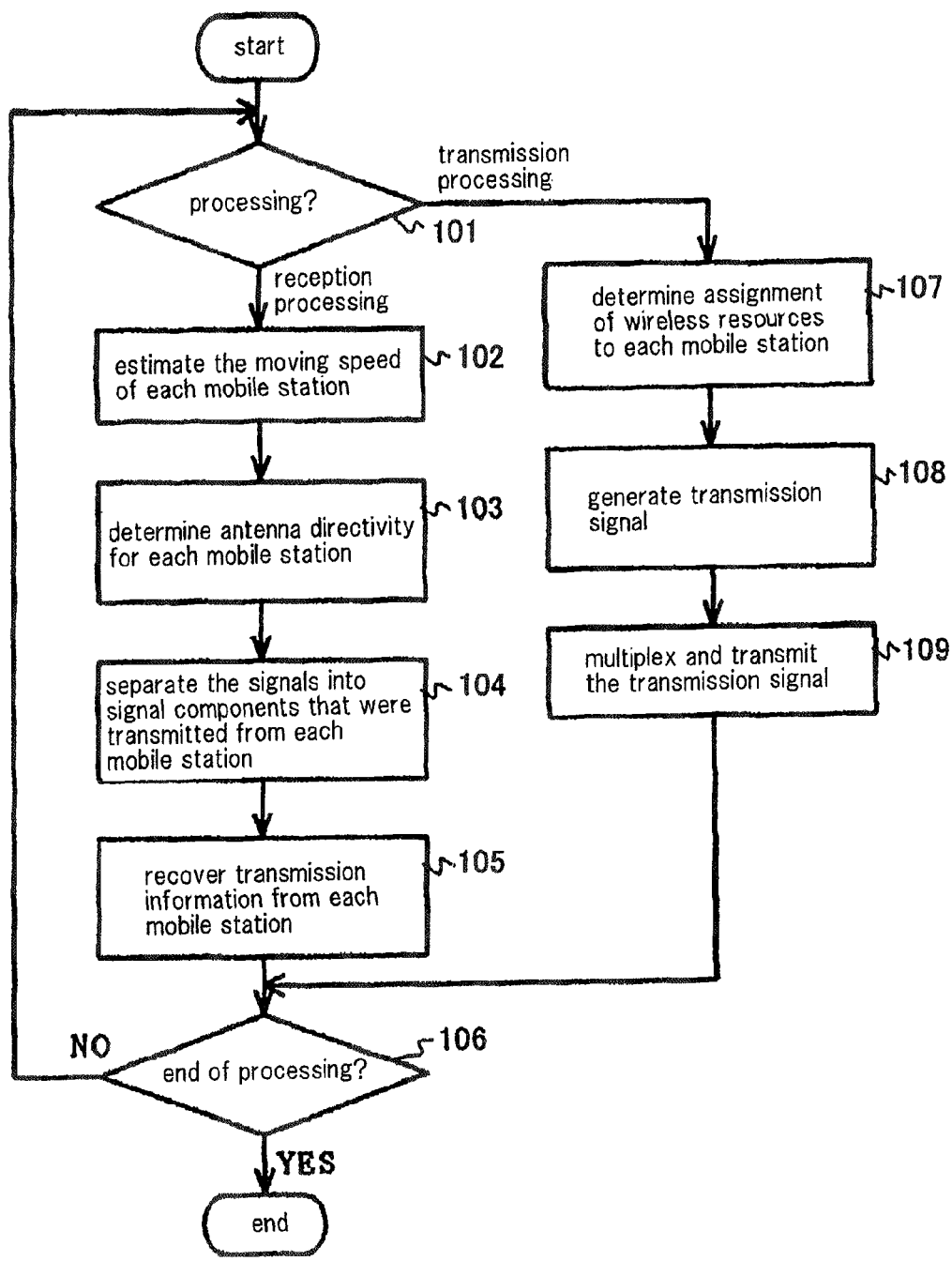
FIG. 4 is a flowchart of the operation of the wireless communication apparatus shown in FIG. 3.

FIG. 4 is a flowchart illustrating operation of wireless communication apparatus 1. Operation of wireless communication apparatus 1 will be explained with reference to FIGS. 3 and 4.

During the signal reception, switches 13 and 14 capture within wireless communication apparatus 1 respective reception signals $S_{RX1}$, $S_{RX2}$ that were received by respective antennas 11, 12.

Moving speed estimating unit 18 estimates, based on reception signals $S_{RX1}$, $S_{RX2}$ from switches 13, 14, the moving speed of each mobile station (not shown) and outputs estimated moving speed signals $S_{ES1}$, $S_{ES2}$ (step 101, 102). A general method to estimate the moving speed is to detect the phase of a known signal (pilot signal) within reception signals $S_{RX1}$, $S_{RX2}$ at a certain time interval and then to estimate the moving speed from the changes.

Directivity determining unit 19 determines, based on reception signals $S_{RX1}$, $S_{RX2}$ from switches 13,14 and estimated moving speed signals $S_{ES1}$, $S_{ES2}$ from moving speed estimating unit 18, the reception antenna directivity for each mobile station and outputs antenna directivity signals $S_{DC1}$ and $S_{DC2}$ indicative of the antenna directivity for each mobile station (step 103). As a method to determine the reception antenna directivity in directivity determining unit 19, a method may be employed, for example, to estimate the direction of arrival of a signal using a known signal (pilot signal) contained in reception signals $S_{RX1}$, $S_{RX2}$ and then to determine beam widths using estimated moving speed signals $S_{ES1}$, $S_{ES2}$.

Signal separating unit 15 receives reception signals $S_{RX1}$, $S_{RX2}$ from respective switches 13, 14 by using antenna directivity signals $S_{DC1}$ and $S_{DC2}$ from directivity determining unit 19, separates the signals into signal components that were transmitted from each mobile station, and outputs reception mobile station signals $S_{RXMS1}$, $S_{RXMS2}$ (step 104).

Signal recovering units 16, 17 receives as input respective reception mobile station signals $S_{RXMS1}$, $S_{RXMS2}$ from signal separating unit 15, recovers transmission information from each mobile station, and outputs respective recovered mobile station signals $S_{RSMS1}$, $S_{RSMS2}$ (step 105).

If all the processing in wireless communication apparatus 1 is completed (step 106), then control goes to the end.

On the other hand, during the signal transmission, resource assigning unit 20 assigns, based on service quality signal $S_{QOS}$ and estimate moving speed signals $S_{ES1}$, $S_{ES2}$ from moving speed estimating unit 18, resources of transmission signals to each mobile station, and outputs resource assignment signal $S_{RA1}$, $S_{RA2}$ (steps 101, 107).

Transmission signal generating units 21, 22 generate, based on respective transmission information $S_{TX1}$, $S_{TX2}$, respective antenna directivity signals $S_{DC1}$ and $S_{DC2}$ from directivity determining unit 19 and respective resource assignment signals $S_{RA1}$, $S_{RA2}$ from resource assigning unit 20, transmission signals, and output transmission signals $S_{TXS1-1}$, $S_{TXS1-2}$, $S_{TXS2-1}$, $S_{TXS2-2}$ (step 108).

Signal multiplexing unit 23 multiplexes, base on resource assignment signal $S_{RA1}$, $S_{RA2}$ from resource assigning unit 20, transmission signals $S_{TXS1-1}$, $S_{TXS1-2}$, $S_{TXS2-1}$, $S_{TXS2-2}$ from transmitting signal generating units 21, 22, and outputs multiplexed transmission signals $S_{DTXS1}$, $S_{DTXS2}$ (step 109).

If all the processing in wireless communication apparatus 1 is completed (step 106), then control goes to the end.

By performing the aforementioned processing, wireless communication apparatus 1 can simultaneously achieve both the suppression of interference between mobile stations and the capability to track mobile stations that are moving at a high speed.

It is to be noted that wireless communication apparatus 1 shown in FIG. 3 may be realized by storing the processing illustrated in FIG. 4 in a recording medium as a computer program and running the computer program stored in the recording medium by means of a computer.

Figure 5:
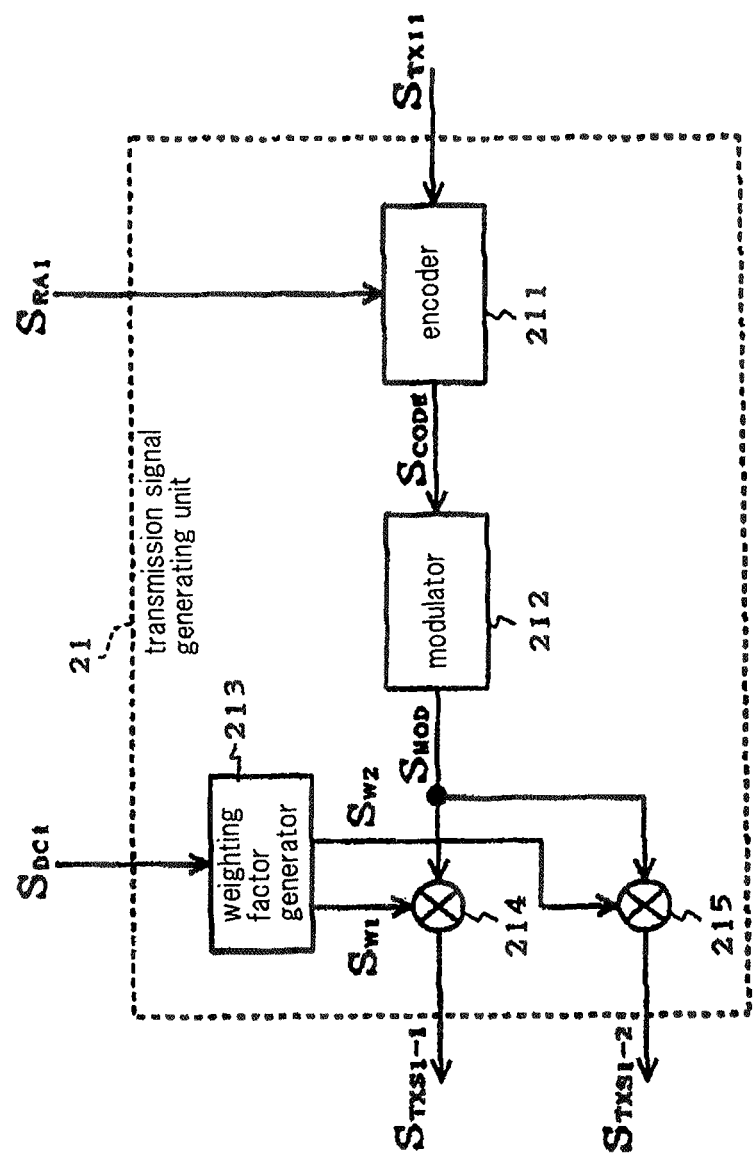
FIG. 5 is a block diagram illustrating a first example of the configuration of a transmission signal generating unit.

FIG. 5 is a block diagram illustrating a first example of the configuration of transmission signal generating unit 21.

As shown in FIG. 5, transmission signal generating unit 21 is comprised of encoder 211, modulator 212, weighing factor generator 213 and multipliers 214, 215. Transmission signal generating unit 22 shown in FIG. 3 is of the same configuration as transmission signal generating units 21, and performs the operation described below.

Encoder 211 receives as input resource assignment signal $S_{RA1}$ from resource assigning unit 20 and transmission information $S_{TX1}$, encodes, among transmission signals $S_{TX1}$, transmission information whose amount corresponds to radio resources assigned by resource assignment signal $S_{RA1}$, and outputs encoded signal $S_{CODE}$. Modulator 212 receives as input encoded signal $S_{CODE}$ from encoder 211, modulates it and outputs modulated signal $S_{MOD}$. Weighing factor generator 213 receives as input antenna directivity signal $S_{DC1}$ from directivity determining unit 19 and outputs antenna weight factors $S_{W1}$, $S_{W2}$ corresponding to the directivity that is indicated by antenna directivity signal $S_{DC1}$. If the transmission direction and the beam width of an antenna are determined, then weighing factors can be uniquely determined. Therefore, if weighing factor generator 213 previously possesses a table having the transmission direction and the beam width as indexes, then antenna weight factors $S_{W1}$, $S_{W2}$ are output by searching the table based on $S_{DC1}$. Alternatively, weighing factor generator 213 may convert $S_{DC1}$ into weight factors using a conversion equation. Multipliers 214, 215 complex-multiply modulated signal $S_{MOD}$ from modulator 212 by antenna weighting factors $S_{W1}$, $S_{W2}$ from weighing factor generator 213, respectively, and output the result of the complex-multiplication as transmission signals $S_{TXS1-1}$, $S_{TXIS-2}$.

Figure 6:
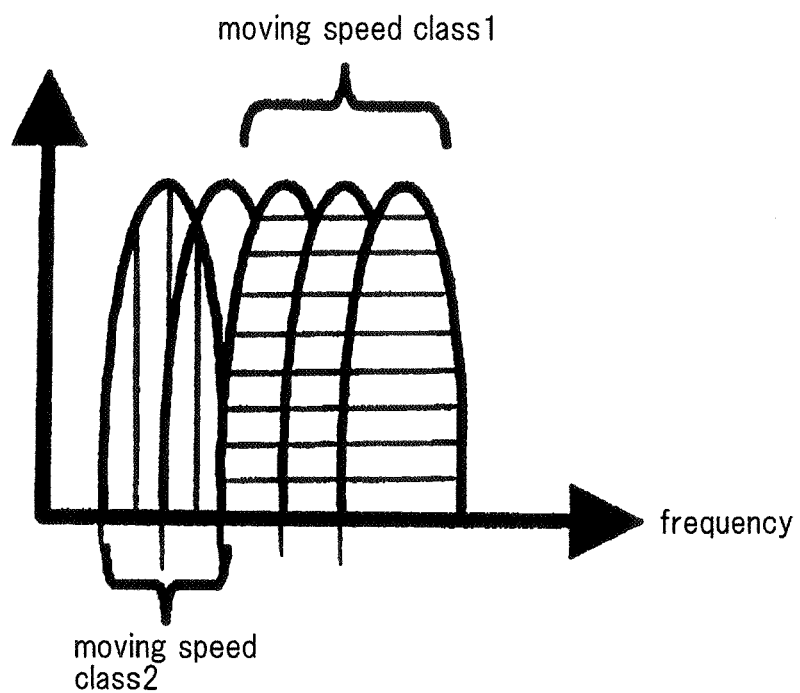
FIG. 6 is a diagram illustrating the manner in which signals are multiplexed in a signal multiplexing unit in the first embodiment of the present invention.
Figure 7:
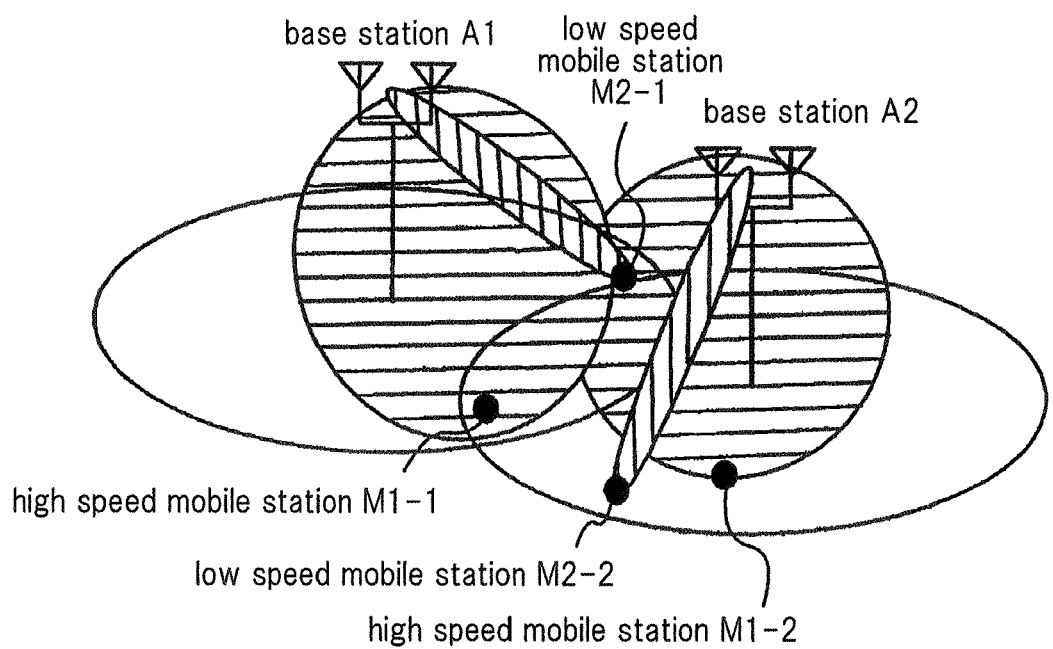
FIG. 7 is a diagram illustrating examples of antenna directivities for each mobile station when a resource assigning unit in the first embodiment has performed resource assignment.

FIG. 6 illustrates the manner in which signals are multiplexed in signal multiplexing unit 23 in the first embodiment of the present invention, and FIG. 7 illustrates examples of antenna directivity for each mobile station when resource assigning unit 20 has performed resource assignment. Operation of the first embodiment will now be described with reference to FIGS. 5 to 7.

In the present embodiment, ODFM (Orthogonal Frequency Division Multiplexing) is employed as a wireless communication scheme, and mobile stations that are moving at a low speed are assigned a sub-carrier for moving speed class 1 and mobile stations that are moving at a high speed are assigned a sub-carrier for moving speed class 2, as shown in FIG. 6.

FIG. 7 illustrates interference between base stations when, in each base stations A1, A2, directivity determining unit 19 has determined a directivity of narrow beam width, for mobile stations M2-1, M2-2 that are moving at a low speed, resource assigning unit 20 assigns a sub-carrier for moving speed class 1 to mobile stations M2-1, M2-2; and when, in each base stations A1, A2, directivity determining unit 19 has determined a directivity of wide beam width, for mobile stations M1-1, M1-2 that are moving at a high speed, resource assigning unit 20 assigns a sub-carrier for moving speed class 2 to mobile stations M1-1, M1-2.

Since mobile stations M2-1, M2-2 that are moving at a low speed are assigned a sub-carrier common to base stations A1, A2, unlike mobile stations M1-1, M1-2 that are moving at a high speed, base stations A1, A2 do not suffer from interference due to transmission signals to mobile stations M1-1, M1-2 that are moving at a high speed, thus achieving the suppression of interference between base stations due to antenna directivities. On the other hand, for mobile stations M1-1, M1-2 that are moving at a high speed, although the effect of the suppression of interference between base stations is small, a high tracking capability can be achieved without causing interference to mobile stations M2-1, M2-2 that are moving at a low speed.

For mobile stations that are moving at a high speed that is less than V, where V is an arbitrary positive real number, transmission signal generating units 21, 22 may render a directivity control signal non-directional, generate and output transmission signals made up of different transmission series.

Service quality signal $S_{QOS}$ may include required communication quality information for each mobile station, and of the mobile stations that belong to a certain moving speed class, resource assigning unit 20 may preferentially assign an unassigned radio resource that corresponds to the moving speed class, to a mobile station having a low communication quality.

Service quality signal $S_{QOS}$ may include propagation path quality information for each mobile station, and of the mobile stations that belong to a certain moving speed class, resource assigning unit 20 may preferentially assign an unassigned radio resource that corresponds to the moving speed class, to a mobile station having a high propagation path quality.

Signal multiplexing unit 23 may frequency-multiplex, sub-carrier multiplex, or time-multiplex transmission signals to mobile stations having different moving speed classes.

Figure 8:
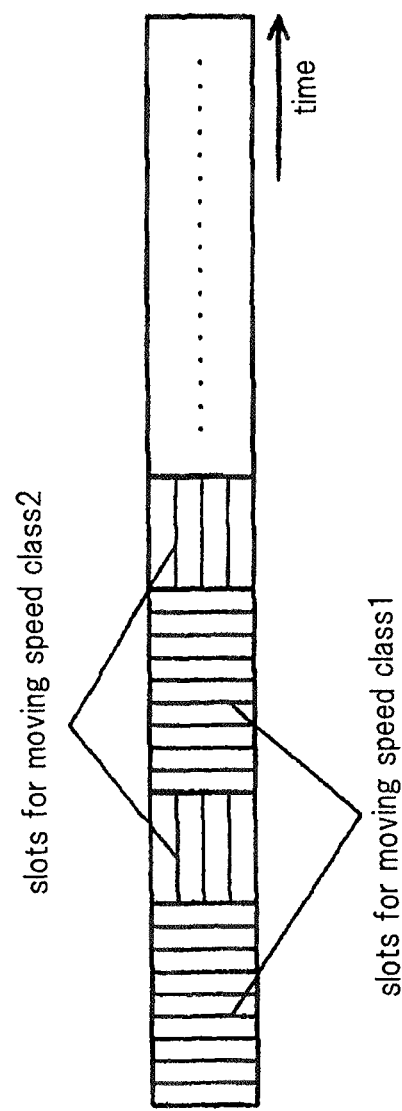
FIG. 8 is a diagram illustrating the manner in which signals are multiplexed in a signal multiplexing unit in a second embodiment of the present invention.

FIG. 8 illustrates the manner in which signals are multiplexed in signal multiplexing unit 23 in a second embodiment of the present invention. The configuration of a wireless communication apparatus of the second embodiment is the same as that of the wireless communication apparatus shown in FIG. 3, and hence the explanation thereof is omitted.

In the present embodiment, each moving speed class is assigned a different time slot. Further, in the present embodiment, an identical frame format is used among all base stations and synchronization is performed between the stations. Therefore, similar to the first embodiment described above, mobile stations M2-1, M2-2 that are moving at a low speed are assigned a sub-carrier common to base stations A1, A2, unlike mobile stations M1-1, M1-2 that are moving at a high speed, as shown in FIG. 7. As a result, mobile stations M2-1, M2-2 do not suffer from interference caused by transmission signals to mobile stations M1-1, M1-2 that are moving at a high speed, thus achieving the suppression of interference between base stations due to antenna directivities. On the other hand, for mobile stations M1-1, M1-2 that are moving at a high speed, although the effect of the suppression of interference between base stations is small, a high tracking capability can be achieved without causing interference to mobile stations M2-1, M2-2 that are moving at a low speed.

Figure 9:
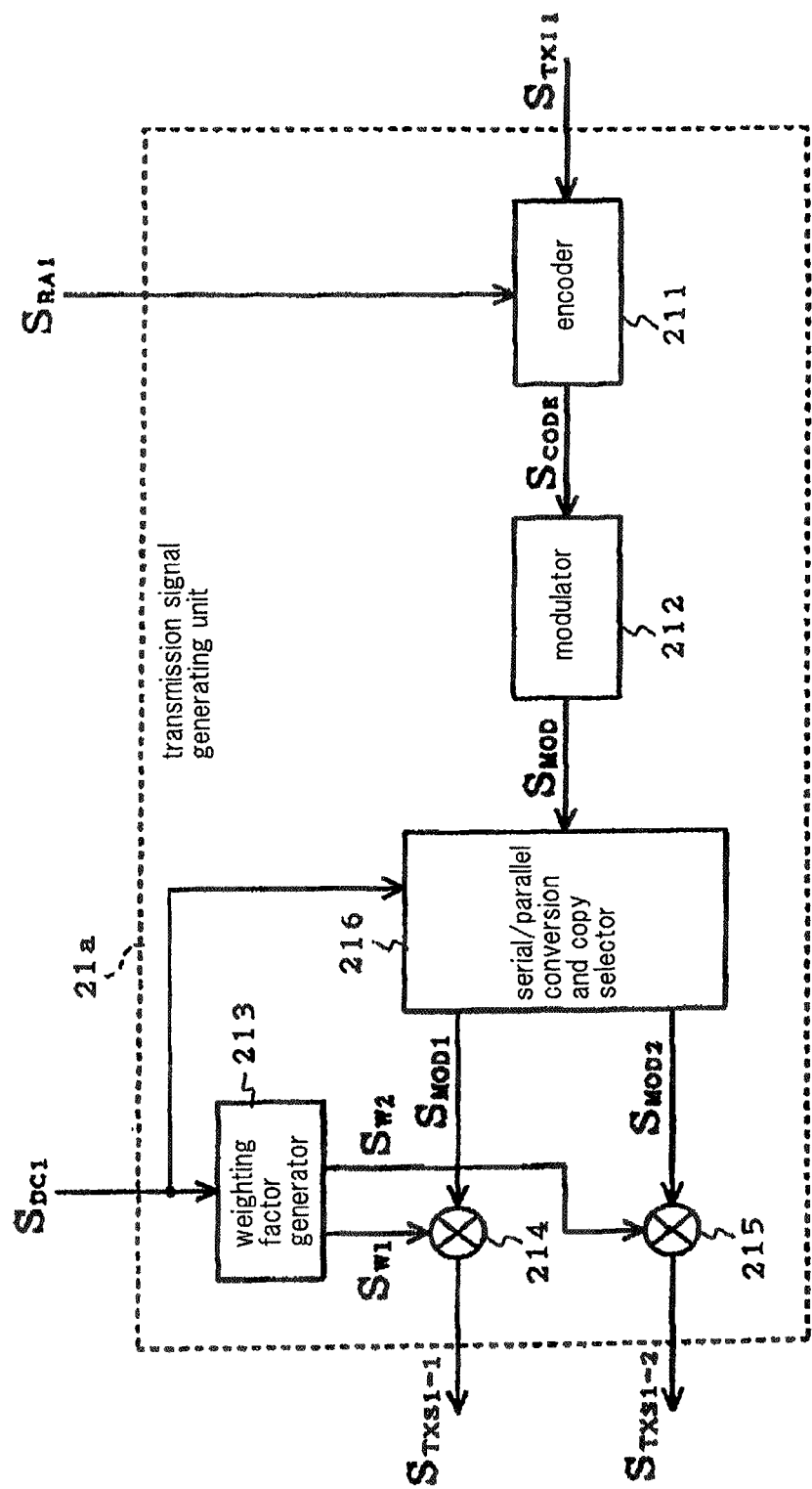
FIG. 9 is a block diagram illustrating a second example of the configuration of a transmission signal generating unit.

FIG. 9 is a block diagram illustrating a second example of the configuration of the transmission signal generating unit.

As shown in FIG. 9, transmission signal generating unit 21a is comprised of encoder 211, modulator 212, weighing factor generator 213, multipliers 214, 215, and serial/parallel and copy selection unit 216.

Encoder 211 receives as input resource assignment signal $S_{RA1}$ from resource assigning unit 20 and transmission information $S_{TXT1}$, encodes, among transmission information $S_{TXT1}$, transmission information whose amount corresponds to radio resources allocated by resource assignment signal $S_{RA1}$, and outputs encoded signal $S_{CODE}$. Modulator 212 receives as input encoded signal $S_{CODE}$ from encoder 211, modulates it, and outputs modulated signal $S_{MOD}$. Serial/parallel and copy selection unit 216 receives as input modulated signal $S_{MOD}$ from modulator 212 and antenna directivity signal $S_{DC1}$ from directivity determining unit 19 and outputs modulated signals $S_{MOD1}$ and $S_{MOD2}$. Weighing factor generator 213 receives as input antenna directivity signal $S_{DC1}$ from directivity determining unit 19 and outputs antenna weighting factors $S_{W1}$, $S_{W2}$ corresponding to the directivity that is indicated by antenna directivity signal $S_{DC1}$. Multipliers 214, 215 complex-multiply modulated signals $S_{MOD1}$ and $S_{MOD2}$ from serial/parallel and copy selection unit 216 by antenna weighting factors $S_{W1}$, $S_{W2}$ from weighing factor generator 213, respectively, and output transmission signals $S_{TXS1-1}$, $S_{TXS1-2}$, as the result of the complex-multiplication.

If the directivity information in antenna directivity signal $S_{DC1}$ does not represent non-directional, serial/parallel and copy selection unit 216 copies modulated signal $S_{MOD}$ and outputs the copied modulated signal as modulated signals $S_{MOD1}$ and $S_{MOD2}$. This is the same operation as in the first embodiment. However, if the directivity information in antenna directivity signal $S_{DC1}$ represents non-directional, serial/parallel and copy selection unit 216 performs a serial to parallel conversion of modulated signal $S_{MOD}$ and outputs the converted modulated signal as modulated signals $S_{MOD1}$ and $S_{MOD2}$. Thus, modulated signals $S_{MOD1}$ and $S_{MOD2}$ are different information, and are MIMO (Multiple Input Multiple Output)-multiplexed for output. This means that the amount of transmission information in the present embodiment is double that in the case where antenna directivity is used, and the throughput of a moving speed is increased. Conversely, if the throughput is constant, it is possible to reduce radio resources to be assigned to mobile stations M1-1, M1-2 that are moving at a high speed, which increases radio resources to be assigned to mobile stations M2-1, M2-2 that are moving at a low speed. Thus, the effect of the suppression of interference between base stations is enhanced.

Figure 10:
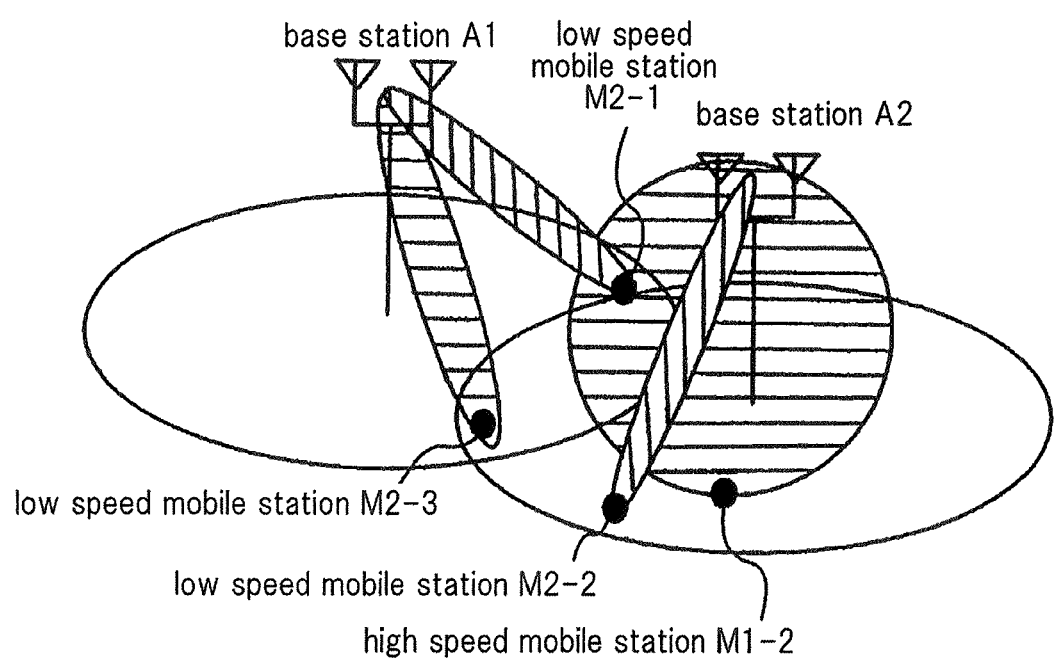
FIG. 10 is a diagram illustrating examples of antenna directivities for each mobile station when a resource assigning unit in the second embodiment has performed resource assignment.

FIG. 10 illustrates interferences between base stations in the second embodiment of the present invention. As illustrated in FIG. 6 or 8, if a radio resource is fixedly assigned for each moving speed class, for example, if the number of mobile stations belonging to one moving speed class is large and the number of mobile stations belonging to the other moving speed class is small or zero, then utilization of resources is decreased.

In the present embodiment, when there is an unassigned resource in the resources for moving speed class 2, this resource is assigned to a mobile station that belongs to moving speed class 1. FIG. 10 illustrates interference between base stations in this case. Although a resource for moving speed class 2 is assigned to mobile station M2-3 that is moving at a low speed, this does not increase interference between base stations because a directivity with a narrow beam width is used. Therefore, in the present embodiment, utilization of resources can be increased without loss of the advantages of the present invention.

On the other hand, when there is an unassigned resource in the resources for moving speed class 1, if this resource is assigned to a mobile station that belongs to moving speed class 2, interference is imparted to a base station that uses both resources for moving speed class 1 and a directivity with a narrow beam width because a directivity with a wide beam width is used. This tends to worsen the effect of suppressing interference between base stations.

The embodiments described above are directed to a case where there are two antennas, two mobile stations, and two classifications. However, the present invention is also applicable to a case where there are three or more antennas, three or more mobile stations, and three or more classifications, and is not limited to the embodiments described above.

What is claimed is:

1. A wireless communication apparatus for tracking mobile stations that are moving at high speed and for suppressing interference when transmitting signals to and receiving signals from N mobile stations, with N being a natural number greater than 2 or equal to 2, said apparatus comprising:

at the reception side,
moving speed estimating means for estimating a moving speed of each mobile station based on M reception signals each received by the corresponding antenna, M being a natural number greater than 2 or equal to 2;
directivity determining means for determining an antenna directivity for each mobile station based on said M reception signals and the moving speeds estimated by said moving speed estimating means;
signal separating means for separating said M reception signals into signal components that have been transmitted from respective mobile stations, based on the directivities that have been determined by said directivity determining means; and
signal recovering means for recovering transmission signals from respective mobile stations based on the respective signal components that have been separated by said signal separation means;
at the transmission side,
resource assigning means for determining radio resource assignments;
said resource assigning means assigns at least one of frequencies and time slots to said respective mobile stations based on a service quality signal indicative of the service quality of the mobile stations and the moving speeds estimated by said moving speed estimating means to suppress interference between mobile stations;

transmission signal generating means for generating N trans-mission signals based on N transmission information, the directivities that have been determined by said directivity determining means, and the resource assignments that have been determined by said resource assigning means; and transmission signal multiplexing means for multiplexing said N transmission signals that have been generated by said transmission signal generating means, using the resource assignments that have been determined by said resource assigning means, and outputting the multiplexed transmission signal, said directivity determining means determines directivity with a wide beam width for mobile stations that are moving at a high speed, estimated by said directivity deciding means, and determines directivity with a narrow beam width for mobile stations that are moving at a low speed, estimated by said directivity deciding means, where the directivity with the narrow beam width is determined in order to increase a tracking capability, wherein said resource assigning means classifies said moving speeds into L moving speed classes, L being an arbitrary natural number, and assigns different radio resources to said moving speed classes based on an assignment policy that said resource assigning means of other wireless communication apparatuses use to assign radio resources.

2. The wireless communication apparatus according to claim 1, wherein for mobile stations moving at a high speed, said transmission signal generating means renders a directivity control signal non-directional, generates and outputs transmission signals each made up of M transmission series, for mobile stations whose moving speeds, that have been estimated by said moving speed estimating means, are less than or equal to a predetermined value.

3. The wireless communication apparatus according to claim 1, wherein, when radio resources for jth moving speed class, where $2 \leq j \leq L$ is an arbitrary integer number, include an unassigned resource, said re-source assigning means assigns the unassigned resource to mobile stations whose moving speed belong to any one of the 1 to j−1th moving speed class for low moving speeds.

4. The wireless communication apparatus according to claim 3, wherein said service quality signal includes required communication quality in-formation for each mobile station, and said resource assigning means preferentially assigns the unassigned radio resource that corresponds to said jth moving speed class to a mobile station having low required communication quality in-formation, from among mobile stations belonging to any one of the 1 to j−1th moving speed class.

5. The wireless communication apparatus according to claim 3, wherein said service quality signal includes propagation path quality information for each mobile station, and said resource assigning means preferentially assigns the unassigned radio resource that corresponds to said jth moving speed class to a mobile station having high required propagation path quality information, from among mobile stations belonging to any one of the 1 to j−1th moving speed class.

6. The wireless communication apparatus according to any of claims 2 to 5, wherein said signal multiplexing means frequency-multiplexes transmission signals to mobile stations belonging to different moving speed classes.

7. The wireless communication apparatus according to any of claims 2 to 5, wherein, when OFDM is employed as a radio transmission scheme, said signal multiplexing means sub-carrier multiplexes transmission signals to mobile stations belonging to different moving speed classes.

8. The wireless communication apparatus according to any of claims 2 to 5, wherein said signal multiplexing means time-multiplexes trans-mission signals to mobile stations belonging to different moving speed classes.

9. In a wireless communication apparatus tracking mobile stations that are moving at high speed and for suppressing interference when transmitting signals to and receiving signals from N mobile stations, N being a natural number greater than 2 or equal to 2, a method of assigning different antenna directivities and different radio resources to the mobile stations based on the moving speed of the mobile stations, the method comprising the steps of:

a) estimating a moving speed of each mobile station based on M reception signals each received by the corresponding antenna, M being a natural number greater than 2 or equal to 2;

b) determining an antenna directivity for each mobile station based on M reception signals and the estimated moving speeds;

c) separating said M reception signals into signal components that have been transmitted from respective mobile stations, based on the determined directivities; and d) recovering transmission signals from respective mobile stations based on the separated respective signal components;

e) determining radio resource assignments;

said determining assigns at least one of frequencies and time slots to said respective mobile stations based on a service quality signal indicative of the service quality of the mobile stations and the estimated moving speeds to suppress interference between mobile stations;

f) generating N transmission signals based on N transmission information, the determined directivities, and the determined resource assignments; and g) multiplexing said N transmission signals generated, using the determined resource assignments and outputting the multiplexed transmission signal, wherein said directivity determining step determines directivity with a wide beam width for mobile stations that are moving at a high speed, estimated by said directivity deciding step, and determines directivity with a narrow beam width for mobile stations that are moving at a low speed, estimated by said directivity deciding step, wherein the directivity with the narrow beam width is determined in order to increase a tracking capability, wherein said step e) includes classifying said moving speeds into L moving speed classes, L being an arbitrary natural number, and assigning different radio resources to said moving speed classes based on an assignment policy that is used in other wireless communication apparatuses to assign radio resources.

10. The method according to claim 9, wherein said step f) includes, for mobile stations that are moving at a high speed, rendering a directivity control signal non-directional, generating and outputting transmission signals each made up of M transmission series, for mobile stations whose moving speeds are less than or equal to a predetermined value.

11. The method according to claim 9, wherein, when radio resources for jth moving speed class, where $2 \leq j \leq L$ and j is an arbitrary integer number, include an unassigned resource, said step e) includes assigning the unassigned resource to mobile stations whose moving speed belong to any one of the 1 j−1th moving speed class for low moving speeds.

12. The method according to claim 11, wherein said service quality signal includes required communication quality information for each mobile station, and said step e) includes preferentially assigning the unassigned radio resource that corresponds to said jth moving speed class to a mobile station having low required communication quality information, from among mobile stations belonging to any of the 1 to j−1th moving speed class.

13. The method according to claim 11, wherein said service quality signal includes propagation path quality information for each mobile station, and said step e) includes preferentially assigning the unassigned radio re-source that corresponds to said jth moving speed class to a mobile station having high required propagation path quality information, from among mobile stations belonging to any of the 1 to j−1th moving speed class.

14. The method according to any of claims 9 and 11 to 13, wherein said step g) includes frequency-multiplexing transmission signals to mobile stations belonging to different moving speed classes.

15. The method according to any of claims 9 and 11 to 13, wherein, when OFDM is employed as a radio transmission scheme, said step g) includes sub-carrier multiplexing transmission signals to mobile stations belonging to different moving speed classes.

16. The method according to any of claims 9 and 11 to 13, wherein said step g) includes time-multiplexing transmission signals to mobile stations belonging to different moving speed classes.

17. In a wireless communication apparatus tracking mobile stations moving at high speed and for suppressing interference when transmitting signals to and receiving signals from N mobile stations, N being a natural number greater than 2 or equal to 2, a non-transitory computer readable storage medium storing a computer program for enabling a computer to perform the function of assigning different antenna directivities and different radio resources to the mobile stations based on the moving speed of the mobile stations, the computer program comprising:

a first instruction code for estimating a moving speed of each mobile station based on M reception signals each received by the corresponding antenna, M being a natural number greater than 2 or equal to 2;

a second instruction code for determining an antenna directivity for each mobile station based on said M reception signals and the estimated moving speeds;

a third instruction code for separating said M reception signals into signal components that have been transmitted from respective mobile stations, based on the determined directivities;

a fourth instruction code for recovering transmission signals to respective mobile stations based on the separated respective signal components;

a fifth instruction code for determining radio resource assignments;

said fifth instruction code assigns at least one of frequencies and time slots to said respective mobile stations based on a service quality signal indicative of the service quality of the mobile stations and the estimated moving speeds to suppress interference between mobile stations;

a sixth instruction code for generating N transmission signals based on N transmission information, the determined directivities, and the determined resource assignments; and a seventh instruction code for multiplexing said N transmission signals generated, using the determined resource assignments and for output-ting the multiplexed transmission signal, wherein said directivity determining instruction code determines directivity with a wide beam width for mobile stations that are moving at a high speed, estimated by said directivity deciding instruction code, and determines directivity with a narrow beam width for mobile stations that are moving at a low speed, estimated by said directivity deciding instruction code, where the directivity with the narrow beam width is determined in order to achieve a high tracking capability, wherein said fifth instruction code classifies based on an assignment policy that is used in other wireless communication apparatuses to assign radio resources.

* * * * *